United States Patent [19]

Bickle

[11] Patent Number: 5,146,817
[45] Date of Patent: Sep. 15, 1992

[54] BORING BAR FOR A LIMITED SLIP DIFFERENTIAL

[76] Inventor: Delton C. Bickle, 1427 Barham Ave., Janesville, Wis. 53547

[21] Appl. No.: 631,461

[22] Filed: Dec. 21, 1990

[51] Int. Cl.[5] .............. B23B 1/00; B23B 5/00
[52] U.S. Cl. .................... 82/1.11; 82/128; 408/1 R; 408/94; 408/81
[58] Field of Search .............. 408/223-225, 408/230, 231, 707, 708, 709, 54, 201, 94, 80-83, 1 R, 84; 29/402.08, 402.06, 402.01, 402.02; 82/128, 1.11, 1.4, 1.2

[56] References Cited

U.S. PATENT DOCUMENTS

| 1,203,539 | 10/1916 | Harkless | 408/94 |
|---|---|---|---|
| 1,373,856 | 4/1921 | Bosch | 408/82 |
| 1,375,839 | 4/1921 | Gallemoa | 408/82 |
| 1,698,862 | 1/1929 | Wadell | 82/128 |
| 1,953,402 | 4/1934 | Graham | 408/94 |
| 2,211,134 | 8/1940 | Kruell | 82/128 |
| 2,274,964 | 3/1942 | James | 82/128 X |
| 3,350,964 | 11/1967 | Brooks | 82/128 |
| 3,447,406 | 6/1969 | Joichi | 82/1.11 |
| 3,881,396 | 5/1975 | Cast | 408/80 X |
| 4,114,483 | 9/1978 | Grimsley | 82/1.2 |
| 5,086,676 | 2/1992 | Gifford et al. | 82/1.11 |

FOREIGN PATENT DOCUMENTS

| 474756 | 6/1951 | Canada | 82/128 |
|---|---|---|---|
| 173934 | 2/1953 | Fed. Rep. of Germany | 408/81 |
| 975023 | 9/1948 | France | 408/81 |
| 477788 | 8/1975 | U.S.S.R. | 408/94 |
| 1114492 | 9/1984 | U.S.S.R. | 408/199 |
| 181971 | 6/1922 | United Kingdom | 408/81 |

Primary Examiner—Larry I. Schwartz
Assistant Examiner—Robert Schultz
Attorney, Agent, or Firm—Leydig, Voit & Mayer

[57] ABSTRACT

A boring tool for refinishing the bearing seat of a limited slip differential case having a side opening and having upper and lower bores which are concentric with the bearing seat. Generally frustoconical centering bushings are wedged into the upper and lower bores of the case, and the boring head is inserted into the case through the side opening. Thereafter, a boring bar is slid downwardly through the upper bushing and the boring head and is slid into the lower bushing, the boring head then being secured to the boring bar. When the boring bar is rotated, the bushings hold the boring head in concentric relation with the bearing seat.

5 Claims, 3 Drawing Sheets

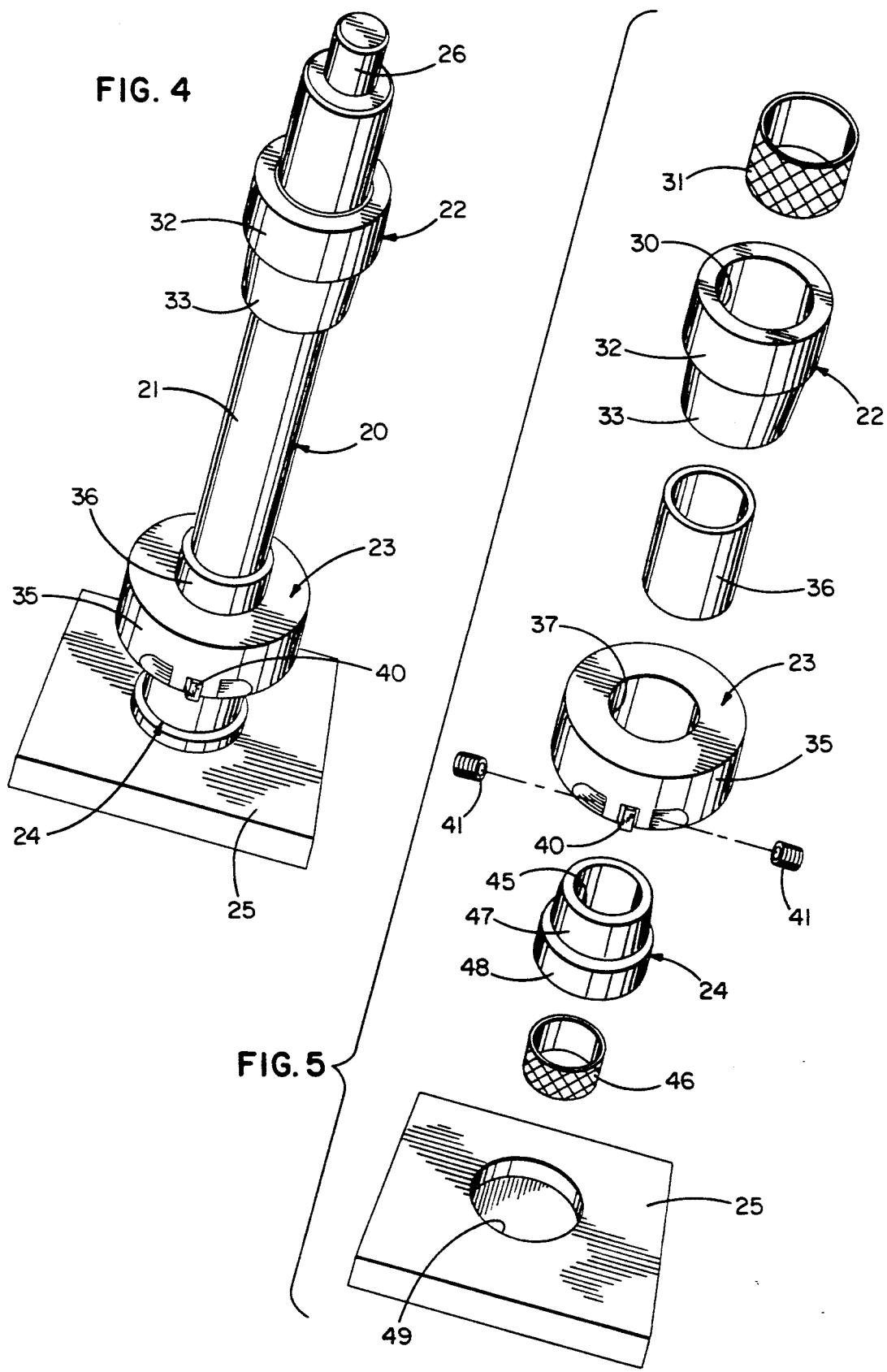

BORING BAR FOR A LIMITED SLIP DIFFERENTIAL

FIELD OF THE INVENTION

The present invention relates to a boring tool for repairing the worn bearing seat in a limited slip differential.

BACKGROUND OF THE INVENTION

Limited slip differentials are used in the automobile and trucking industries to provide an extra margin of traction and safety under severe, slippery road conditions. These differentials are prone to wear out prematurely due to the severity of service.

One reason for failure of the differential is due to wear in the bearing seat which is cast as part of the differential case. Heretofore, there was no choice but to discard not only the entire differential case but also the remaining components which exhibited little, if any, wear and were still usable.

OBJECTS AND SUMMARY OF THE INVENTION

The general aim of the present invention is to provide a boring tool for repairing the bearing seat of a worn differential case.

Another object of the invention is to provide a boring tool which may be quickly and easily assembled to fit within a limited access region in the differential case and which, as an incident to being assembled, is automatically positioned in concentric relation with the bearing seat.

In a more specific sense, the invention resides in a boring tool having a boring head which may be inserted into the differential case through an opening in the side thereof. A boring bar then is inserted through and is secured to the head. Upper and lower bushings coact with the differential case and the boring bar to keep the bar concentric with the case during the boring operation.

These and other objects and advantages of the invention will become more apparent from the following detailed description when taken in conjunction with the accompanying drawings.

BRIEF DESCRIPTION OF THE DRAWINGS

FIG. 4 is a perspective view showing the boring tool positioned for the refinishing operation.

FIG. 5 is an exploded perspective view of the boring tool without the boring bar.

Figure 1:
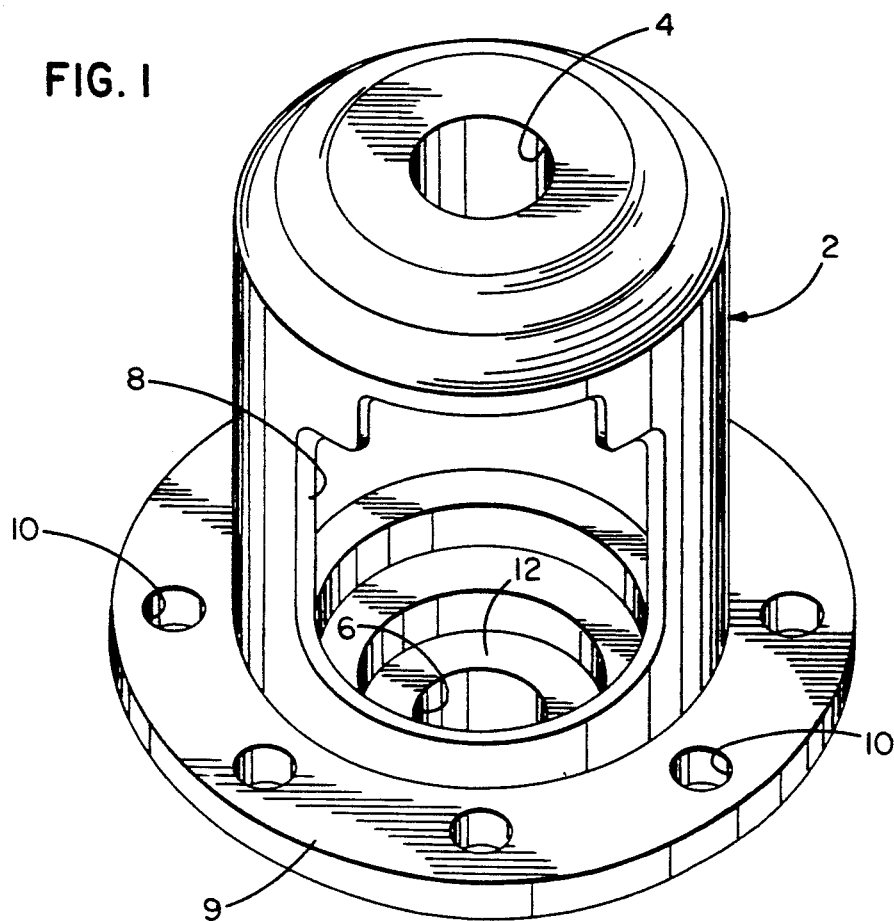
FIG. 1 is a perspective view showing a differential case having a bearing seat which requires refinishing.

While the invention is susceptible to various modifications and alternative constructions, certain illustrative embodiments have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE INVENTION

Figure 2:
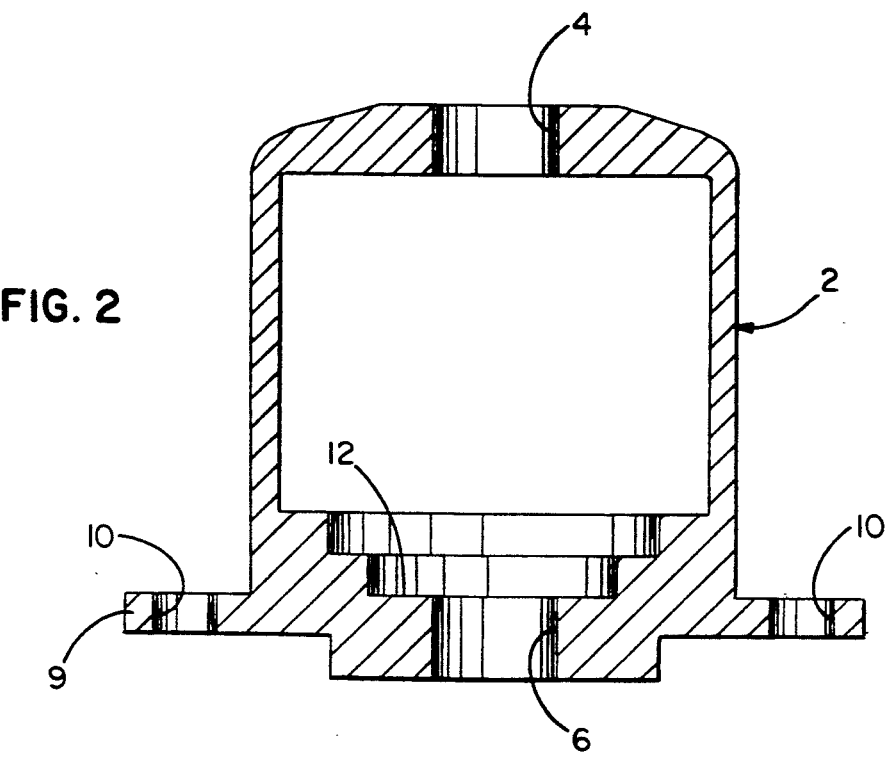
FIG. 2 is a cross-sectional view taken axially through the differential case shown in FIG. 1.

Turning now to the drawings, there is shown in FIGS. 1 and 2 a perspective and an axial cross-sectional view of the cover half of a conventional limited slip differential case 2. The parts used in the differential such as gears, clutches, and pinions (not shown) are adapted to be housed in the differential case 2. The case 2 has an upper bore 4 and a lower bore 6 which are concentrically located to receive the half shaft (not shown) of an automobile. A side opening 8 is formed in one side of the case 2. The case 2 has a flange 9 with a series of holes 10 which permits it to be attached to the flange half (not shown) of the differential case located within the differential housing.

A bearing seat 12 is located within the case 2 and accepts a bearing (not shown). During operation of the differential, the circumferential side wall of the bearing seat sometimes becomes so severely worn that the entire limited slip differential must be replaced.

Figure 3:
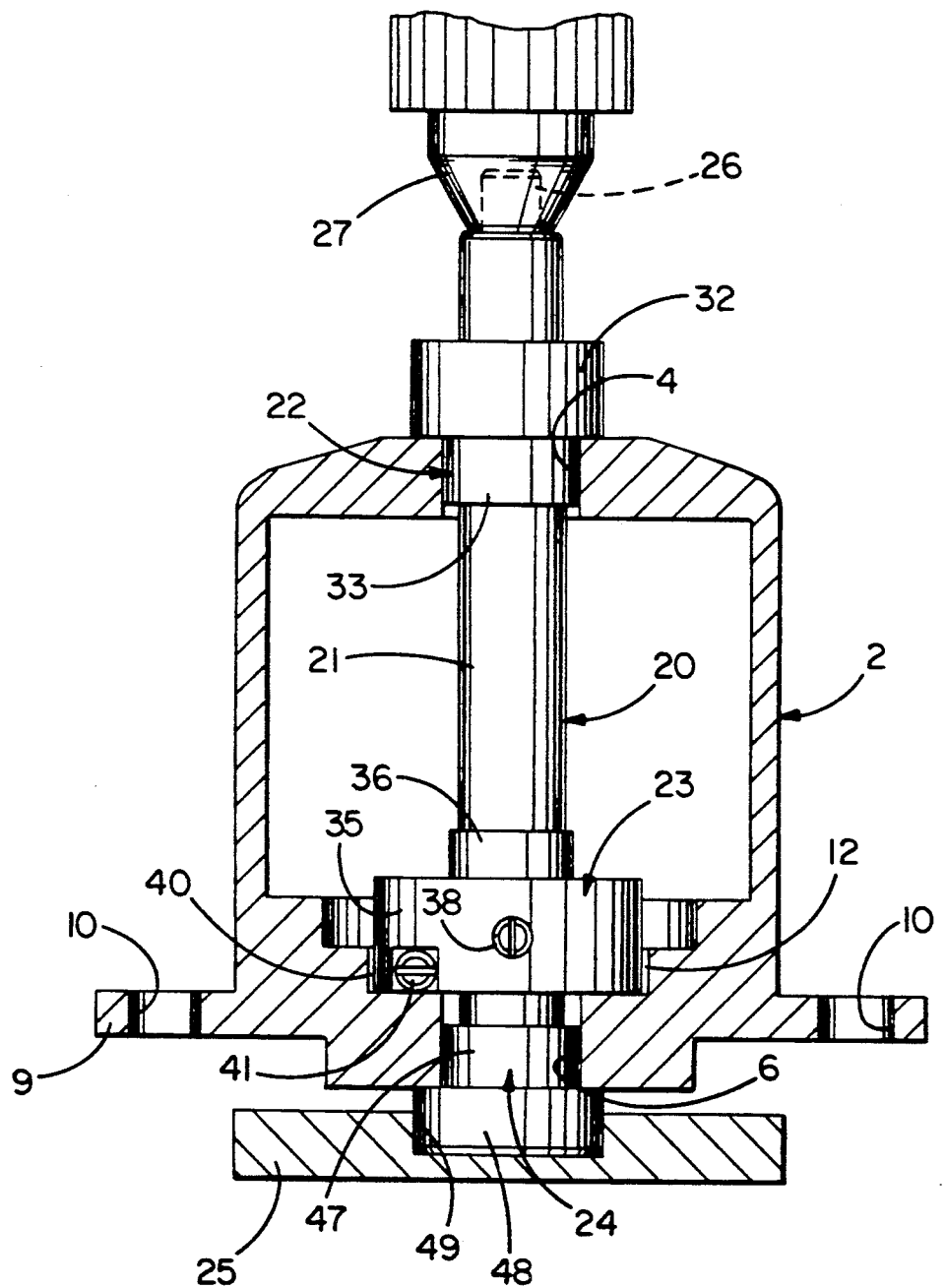
FIG. 3 is a cross-sectional view similar to FIG. 2 but shows the boring tool inserted and assembled within the differential case.

In accordance with the present invention, a boring tool 20 is provided for refinishing the bearing seat 12. As shown in FIGS. 3 and 4, the boring tool comprises an elongated and generally cylindrical boring bar 21 adapted to be assembled slidably with an upper bushing 22, a boring head 23, a lower bushing 24 and a fixture plate 25. The upper end portion of the boring bar includes a reduced diameter shank 26 adapted to be held in the chuck 27 of a conventional milling machine or drill press for rotating the boring bar and the boring head during refinishing of the bearing seat.

The upper bushing 22 is formed with a central bore 30 (FIG. 5) for slidably and rotatably receiving the upper end portion of the boring bar 21, there preferably being a friction-reducing liner 31 made of a material such as Mycardia interposed between the bushing and the boring bar. The bushing 22 includes a generally cylindrical upper end portion 32 and further includes a reduced diameter and downwardly tapered frustoconical lower end portion 33. When the boring tool 20 is assembled with the case 2, the lower frustoconical portion 33 of the bushing 22 telescopes into and wedges tightly within the upper bore 4 of the case.

A bore 37 (FIG. 5) in the boring head receives a bronze liner 36 and allows the boring bar 21 to be slipped endwise through the head. After the boring bar and the head have been located in the proper axial position relative to one another, the two are fastened rigidly together by a set screw 38 (FIG. 3) extending through holes in the boring head and the liner 36 and extending into a keyway in the boring bar.

A carbide cutter tip 40 (FIGS. 4 and 5) is seated in a pocket in one side of the boring head 23 and projects radially from the body 35 thereof. Set screws 41 clamp the cutter in the pocket and may be adjusted to establish a proper setting for the cutter. The set screws enable the cutting circle diameter of the cutter to be infinitely adjusted.

The lower bushing 24 is formed with a central cylindrical bore 45 (FIG. 5) which receives a Mycardia liner 46 for slidably and rotatably supporting the lower end portion of the boring bar 21. The outer surface of the lower bushing is defined by an upwardly tapered upper frustoconical portion 47 and by a lower cylindrical portion 48. As shown in FIG. 3, the upper frustoconical portion 47 of the lower bushing 24 is adapted to telescope into and wedge within the lower bore 6 in the case 2. The lower portion 48 of the bushing 24 underlies the case 2 and seats within a cylindrical hole 49 in the fixture plate 25.

With the foregoing arrangement, the fixture plate 25 is clamped on a work table in such a position that its hole 49 is concentric with the chuck 27. After the lower bushing 24 has been seated in the hole 49 of the fixture plate 25, the case 2 is lowered toward the plate to cause the upper frustoconical portion 47 of the bushing to wedge into the lower bore 6 in the case. Thereafter, the upper bushing 22 is assembled with the case by wedging the lower frustoconical portion 33 of the bushing downwardly into the upper bore 4 of the case.

In keeping with the invention, the boring head 23 then is inserted sidewise through the side opening 8 in the case and is positioned with its bore 37 in alignment with the bushings 22 and 24. The boring bar 21 then is inserted endwise through the upper bushing 22, through the boring head 23 and into the lower bushing 24. After the boring head 23 has been located properly relative to the bearing seat 12, the head is secured to the bar by the set screw 38. The chuck 27 then is lowered onto the shank 26 of the boring bar and is tightened in order to couple the boring bar to the chuck. Rotation of the chuck causes the cutter 40 to enlarge and finish the circumferential wall of the bearing seat.

By virtue of the foregoing, advantage is taken of the side opening 8 in the case 2 to enable the boring head 23 to be assembled with the boring bar 21 inside of the case. During refinishing of the bearing seat 12, the frustoconical portions 33 and 47 of the bushings 22 and 24 coact with the ores 4 and 6 in the case to keep the boring bar 21 and the boring head 23 concentric with the seat 12 and to prevent deflection of the bar. Once the bearing seat has been refinished, the differential may be reassembled using a new standard oversize bearing. As discussed previously, the diameter of the carbide cutter 40 is infinitely adjustable and may be set to preselected dimensions so that standard oversized bearing can be used in the refinished bearing seat 12. Typically, the cutter 40 is initially set for a 0.025" oversized bearing and may be increased by 0.010" until 0.055" oversized. The cutter may, however, be adjusted to the exact size needed for a proper fit.

I claim:

1. A method for refinishing a bearing seat of a limited slip differential, the differential having a case formed with upper and lower bores and with a side opening, the method comprising:
   a) inserting a boring head having a cutter and a central bore into the case through the side opening;
   b) concentrically aligning the boring head and the bearing seat; and
   c) rotating the boring head to cause the cutter to refinish the bearing seat.

2. A method as set forth in claim 1 wherein:
   the bearing seat and boring head are concentrically aligned by inserting frustoconically shaped upper and lower bushings having central bores into the upper and lower bores, respectively; and
   inserting a boring bar into the central bores of the upper bushing, the boring head and the lower bushing.

3. A method of refinishing a bearing seat of a limited slip differential having a case formed with upper and lower axially aligned bores and with a side opening, said bearing seat and said bores being concentric, said method comprising the steps of, centering upper and lower bushings in said upper and lower bores, respectively, inserting a boring head into said case through said side opening, sliding a boring bar through said upper bushing and said boring head and into said lower bushing, securing said boring head to said boring bar, and rotating said boring bar in said bushings to cause said boring head to refinish said bearing seat.

4. A boring tool for refinishing a bearing seat of a limited slip differential case, the case having upper and lower concentric bores and having a side opening, the boring tool comprising:
   a boring bar;
   a boring head having a central bore to receive the boring bar and having a cutter;
   first means for removably attaching the boring head to the boring bar;
   second means for concentrically aligning the boring head and the bearing seat so that the bearing seat is uniformly refinished when the boring head is rotated, said second means comprising frustoconically shaped upper and lower bushings sized to fit into the upper and lower bores, respectively, of the case and having central bores adapted to slidably and rotatably receive the boring bar; and
   a fixture plate having a central bore for receiving the lower bushing.

5. A boring tool as set forth in claim 4 wherein said first means comprises a set screw carried by said boring head and engageable with said boring bar.

* * * * *